Oct. 24, 1933.　　　　W. W. HOLE　　　　1,932,136
APPARATUS FOR ASSEMBLING STORAGE BATTERIES
Filed Feb. 10, 1932　　　5 Sheets-Sheet 2

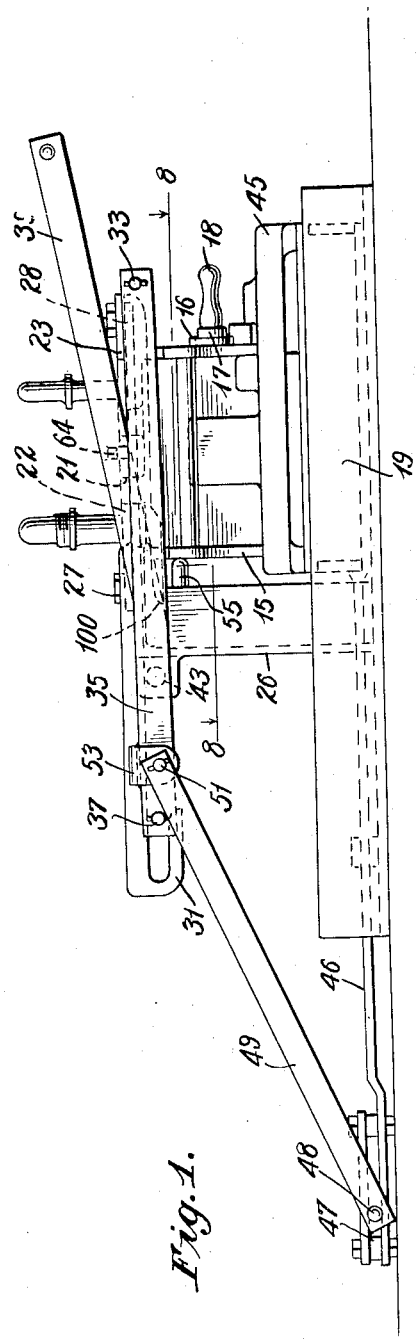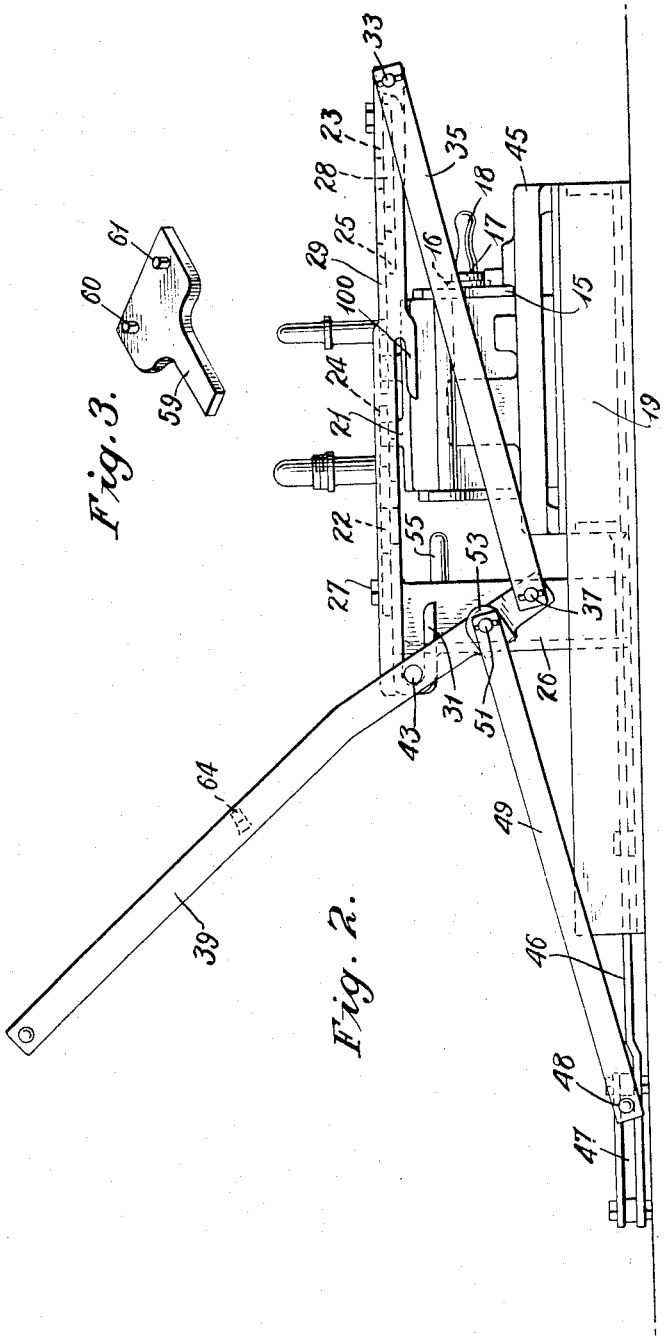

Inventor
William Warren Hole
Edward S Rogers
By
Attorney

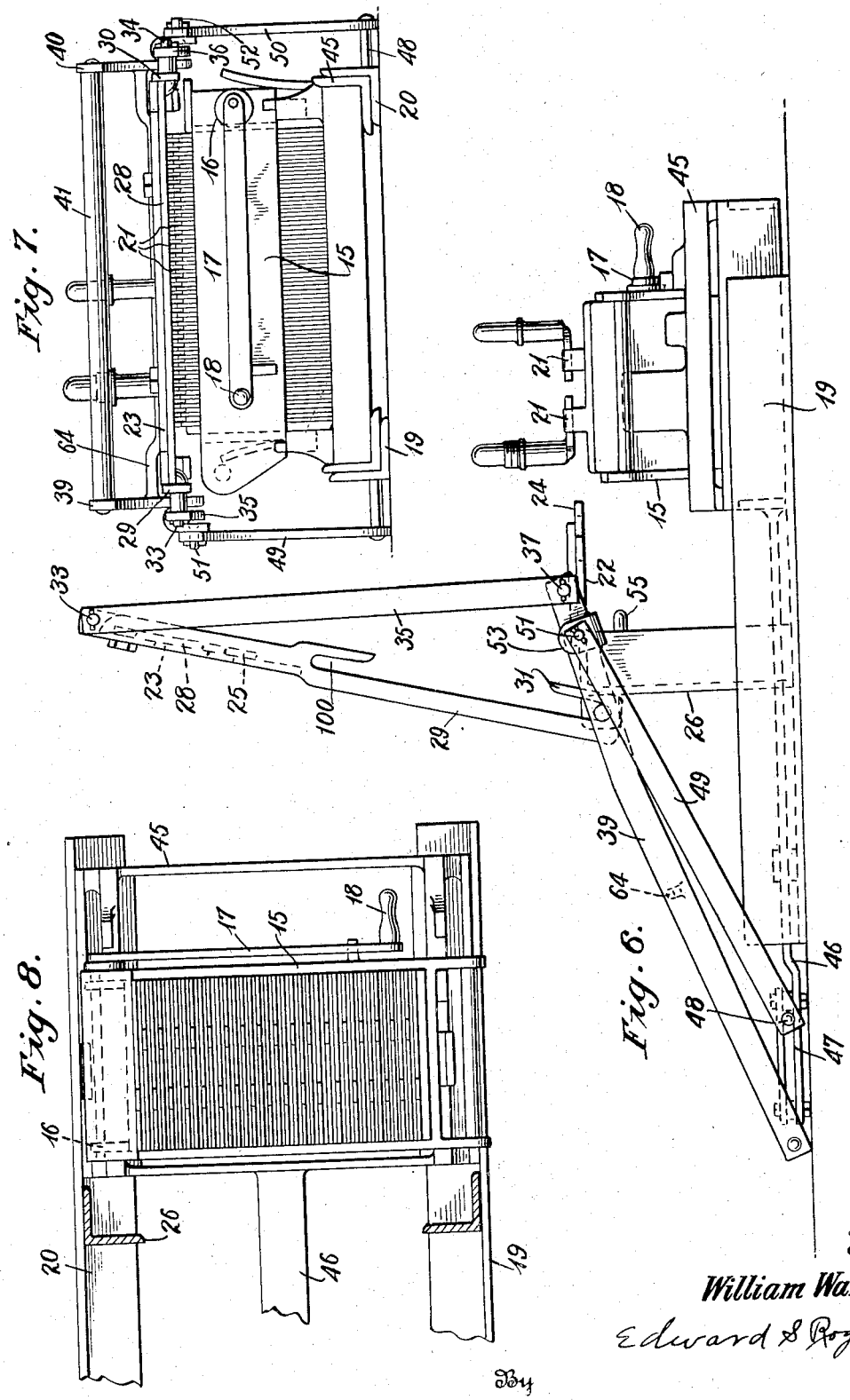

Oct. 24, 1933.  W. W. HOLE  1,932,136
APPARATUS FOR ASSEMBLING STORAGE BATTERIES
Filed Feb. 10, 1932   5 Sheets-Sheet 4

Inventor
William Warren Hole
Edward S Rogers
By
Attorney

Oct. 24, 1933.                    W. W. HOLE                    1,932,136
                    APPARATUS FOR ASSEMBLING STORAGE BATTERIES
                         Filed Feb. 10, 1932          5 Sheets-Sheet 5
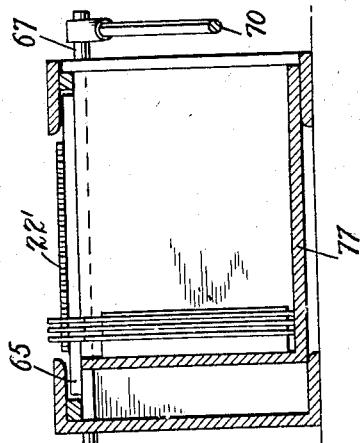
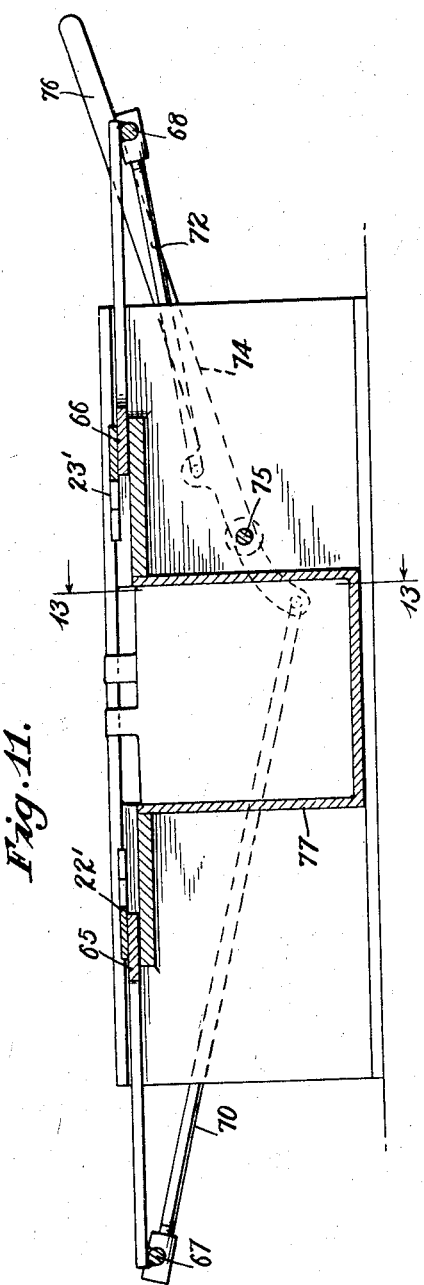
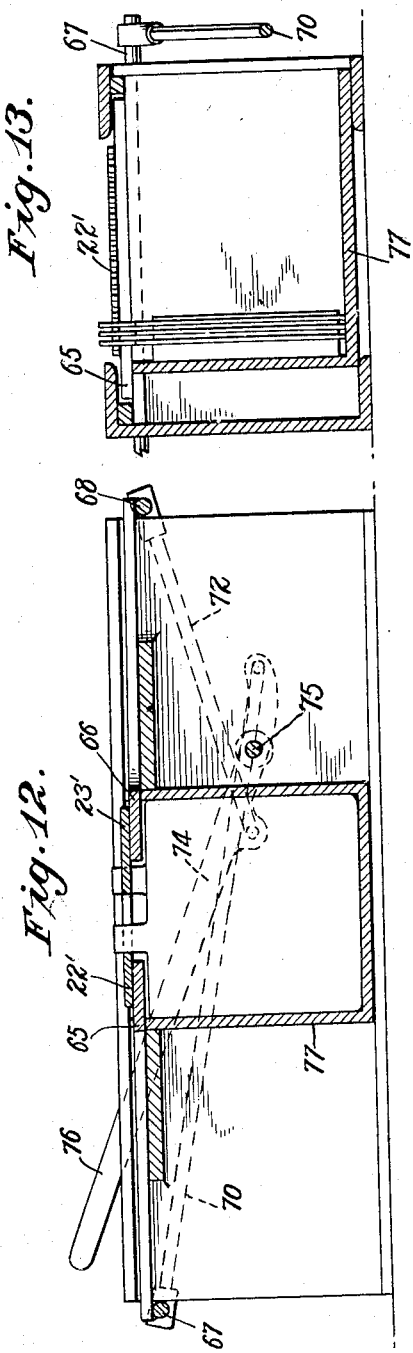
Inventor
William Warren Hole
By Edward S Rogers
Attorney Patented Oct. 24, 1933

1,932,136

UNITED STATES PATENT OFFICE 1,932,136

APPARATUS FOR ASSEMBLING STORAGE BATTERIES

William Warren Hole, Honolulu, Territory of Hawaii, assignor to International Battery Company, Limited, Honolulu, Territory of Hawaii, a corporation of Hawaii Application February 10, 1932. Serial No. 592,131

11 Claims. (Cl. 113—59)

The invention relates to the assembly of storage battery plates and has as an object the provision of a device for holding the assembled plates in position while the lug straps are burned to the plate lugs.

It is a further object of the invention to provide a device for holding the battery plates in assembly while placing and burning the lug straps upon the lugs in such manner as to prevent access of molten lead to the plates or the spaces therebetween.

Further objects of the invention will appear from the following description when read in connection with the accompanying drawings showing illustrative embodiments of the invention and wherein:—

Fig. 1 is a side elevation with the device closed;

Fig. 2 is a like view with the device open for removal of the assembled battery elements;

Fig. 3 is a perspective view of a plate used to separate groups of assembled battery plates;

Fig. 6 is a detail side elevation of the device open with the battery plates ready for removal;

Fig. 7 is an end elevation taken from the right of Fig. 1;

Fig. 8 is a section on line 8—8 of Fig. 1;

Figures 4, 5:
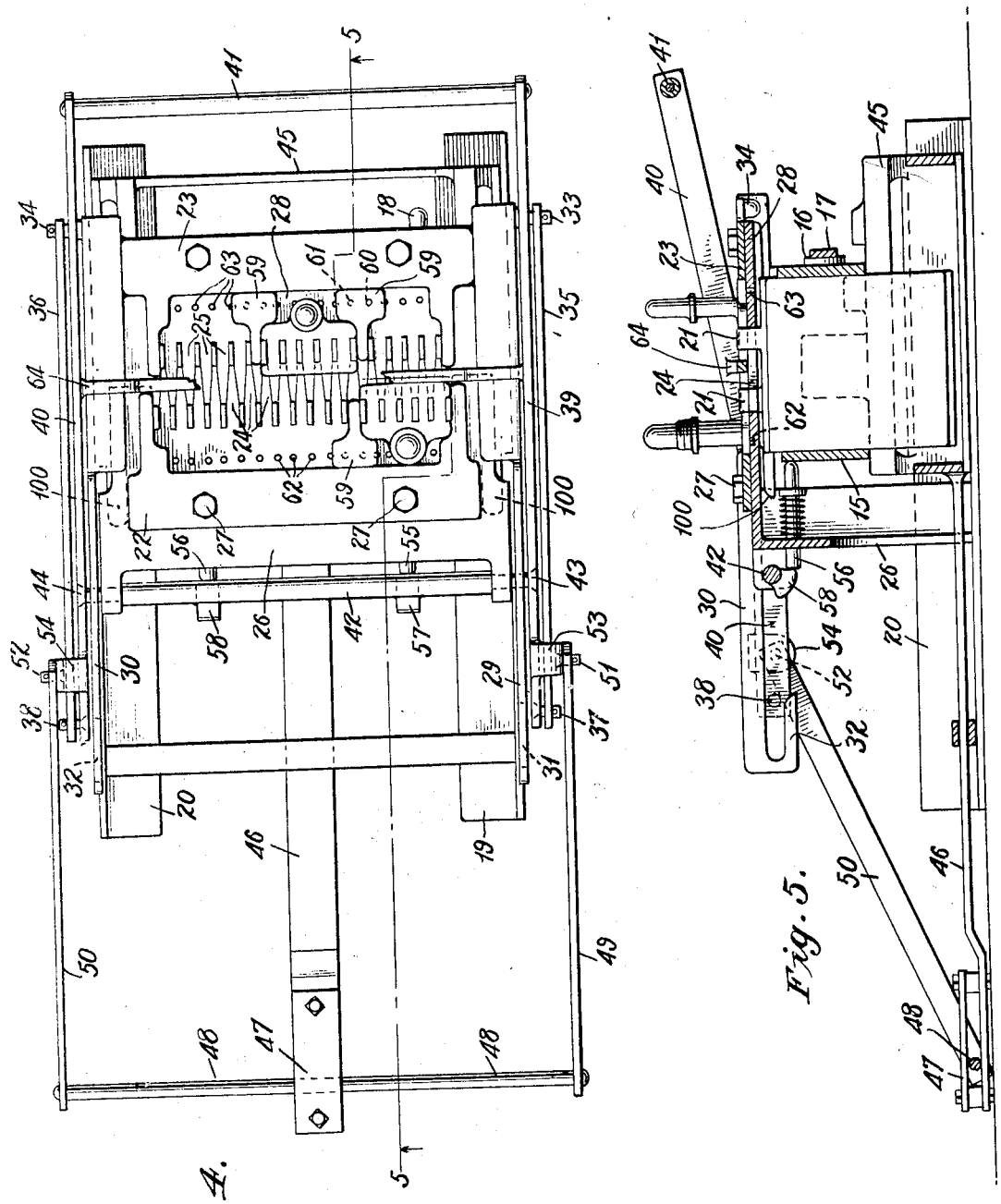
Fig. 4 is a plan view of the device in closed position with a bar broken away.
Fig. 5 is a vertical section on line 5—5 of Fig. 4.
Figure 9:
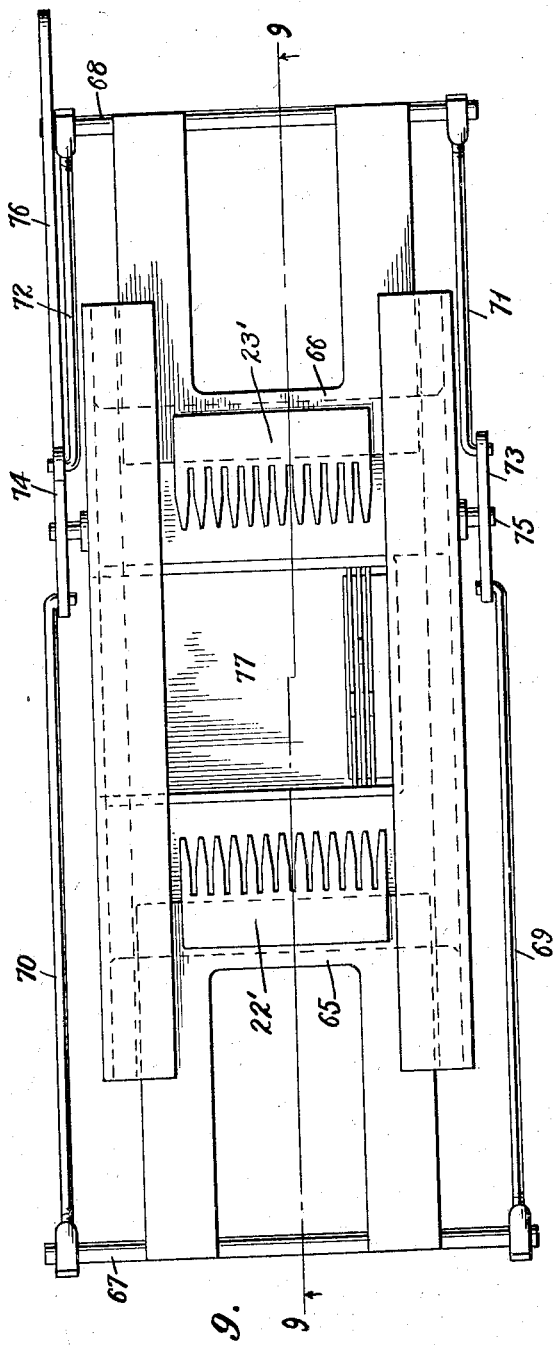
Fig. 9 is a plan view of a modification shown in open position.
Figure 10:
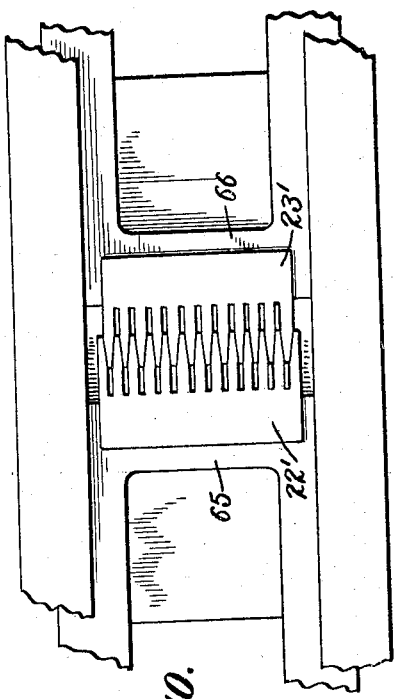
Fig. 10 is a detail plan view of the same form shown in closed position.

Figs. 11 and 12 are vertical sections on line 9—9 showing the device in open and closed positions respectively; and Fig. 13 is a vertical section on line 13—13 of Fig. 11.

As shown in Figs. 1 to 8 inclusive, provision is made for holding the plates assembled to be placed into the machine, in the form of a box 15 having an end slidable therein, which end may be forced inwardly to clamp the assembled plates and separators together as by means of an eccentric cam 16 shown in Fig. 7 operated by a lever 17, said lever being provided with a handle 18. The said box separate from the machine may be placed in an inclined position in the manner of a printer's composing stick and the plates and separators may be assembled therein and clamped together by operation of the eccentric cam 16. The box may then be placed in the device, guideways 19, 20 being provided for reception thereof.

To close the space between the assembled plates carrying the strap lugs 21, the device is provided with a pair of relatively movable plates 22, 23, each plate being provided with staggered comb teeth properly spaced apart for reception of the strap lugs therebetween and the plates when moved to closed position being so formed as to receive the strap lugs of opposite polarity properly spaced from each other.

The comb teeth 24, 25 upon the respective plates are formed with rectangular recesses between them of sufficient depth to receive the width of the strap lugs and beyond this point are tapered to a thickness at their ends equal to the thickness of the strap lugs whereby when they are closed with the strap lugs in position there are no open spaces between or about the strap lugs. The length of the teeth 24, 25 is sufficient to snugly force home the opposite strap lug by contact of the end of each tooth with the respective lug.

In the form of the device under consideration, the plate 22 is stationarily supported upon a standard 26 shown as secured thereto by means of cap screws 27. The plate 23 is secured upon a cross member 28 mounted upon side bars 29, 30 having hooked end portions 31, 32, the cross member 28 being provided with slotted portions 100 adapted to span the plate 22 to accurately align the two plates when the device is closed.

The said bars 29, 30 are in turn pivotally connected at 33, 34 to the ends of bars 35, 36, which bars at their opposite ends are pivotally connected at 37, 38 to bars 39, 40, which latter bars are connected at their free ends by means of a handle member 41. The bars 39, 40 are fixed upon the ends of a revoluble cross member 42 at 43, 44. As a result of this mounting and connections, assuming the device to be in the closed position shown in Figs. 1 and 4, lifting of the free ends of bars 39, 40 by manipulation of the handle 41 will cause a lowering of the ends of bars 35, 36 and a longitudinal movement of the bars 29, 30 carrying the plate 23 longitudinally free of the assembled lugs 21. The longitudinal movement referred to will continue until the hooked ends 31, 32 of bars 29, 30 contact with the cross member 42, after which movement of the bars 39, 40 from the position shown in Fig. 2 will result in swinging the bars 29, 30 and the plate 23 to the position shown in Fig. 6, whereupon the assembled battery plates carrying their strap lugs and post connections may be removed from the device.

With the device in the open position, the clamp box carrying the assembled plates may be placed in position. The reverse of the movements above described will then bring the device to the closed position shown in Fig. 4, whereupon the lug straps may be placed over the plate lugs and burned thereon.

To move the clamp box toward and away from the assembling position, there is shown a tray 45 slidable in the ways 19, 20 operated by means of a bar 46 having a lost-motion connection 47 with a cross member 48 carried by the ends of bars 49, 50, pivotally connected at 51, 52 to U-shaped members 53, 54 rigidly attached to the bars 39, 40 at a point spaced from their fixed pivot.

To initiate movement of the clamp box away from the plate 22, there is shown a pair of plungers 55, 56 standing in the path of movement of cams 57, 58 rigidly carried by the cross member 42 and impinging at their ends upon the side of the clamp box 15, as clearly shown in Fig. 5. The members 53, 54 are formed U-shaped so as to pass about the bars 35, 36 in closed position of the device.

To separate the assembled plates sufficient in number for each respective battery, since it is contemplated to assemble plates for more than one battery at a time, devices such as shown in Fig. 3 at 59, each provided with a pair of lugs 60, 61 are provided, the lugs being for coaction with openings 62, 63 in the respective plates 22, 23, and by provision of different sized devices 59 and by different placements thereof upon the plates 22, 23, a wide variety of sizes of batteries may be assembled by the device.

To accurately space apart the lug straps, the bars 39, 40 are shown as carrying a fixed bar 64, the thickness of which is correct to pass between the lug straps of opposite polarity when in position upon the plates.

In the form of the device shown in Figs. 9 to 13 inclusive, the toothed plates 22', 23' are both movable and are carried upon slidable plates 65, 66 which in turn are connected at their opposite ends to bars 67, 68 connected to links 69, 70, and 71, 72, which links are driven by means of pivoted bars 73, 74 rigidly mounted upon a revoluble shaft 75. The bar 74 is shown as extended to an operating lever 76 and revolution of the lever about its shaft 75 will move the plates 22', 23' to and from each other in an obvious manner.

In this form of the device the plates may be assembled in a box 77 fixedly carried in the device, the device being desirably placed upon an incline so as to cause the plates to lie against each other as assembled.

Minor changes may be made in the physical embodiments of the invention within the scope of the appended claims without departing from the spirit thereof.

I claim:

1. A battery assembling device comprising, in combination, a pair of toothed plates, the teeth of each plate staggered with the teeth of the remaining plate and spaced to receive the strap lugs of battery plates of polarity opposite to that of plate lugs embraced by the opposite plate, the teeth beyond the lug receiving spaces tapered down to the thickness of the said lugs and of a length to abut the lugs embraced by the teeth of the opposite plate whereby said teeth when intermeshed close the space between and about said lugs to prevent access of molten lead to the plates during burning on of straps and means to cause relative movement of said toothed plates to and from each other.

2. A battery assembling device comprising, in combination, a pair of toothed plates, the teeth of each plate staggered with the teeth of the remaining plate and spaced to receive the strap lugs of battery plates of a complete cell therebetween, the teeth beyond the lug receiving spaces tapered down to the thickness of the said lugs whereby said teeth when intermeshed close the spaces between and about said lugs to prevent access of molten lead to the plates during burning on of straps, said teeth of each plate a length to abut and force the lugs of opposite polarity home into the recesses of the other plate, and means to cause relative movement of said toothed plates to and from each other.

3. A battery assembling device comprising, in combination, a stationary and a movable toothed plate, the teeth on each plate spaced to receive strap lugs of the same polarity therebetween and staggered to intermesh with the teeth on the remaining plate spaced to receive strap lugs of the opposite polarity, means to cause initial movement of the movable plate in its plane out of lug-engaging position and subsequently out of its plane to clear the assembled battery plates for removal.

4. A battery assembling device comprising, in combination, a stationary and a movable toothed plate, the teeth on each plate spaced to receive strap lugs of the same polarity therebetween and staggered to intermesh with the teeth on the remaining plate spaced to receive strap lugs of the opposite polarity, means to cause initial movement of the movable plate in its plane out of lug-engaging position and means to align the plane of the movable plate with the plane of the stationary plate as the teeth are brought to intermeshing relation.

5. A battery assembling device comprising, in combination, a stationary toothed plate, a movable toothed plate, the teeth of each of said plates spaced to receive plate lugs of respective polarities between their bases and staggered relative to the teeth on the other plate to intermesh therewith in closed position of the plates, means to initially move the movable plate in its own plane from closed position and subsequently to move the plate out of its plane to clear the assembled plates for removal, means to hold assembled elements of a complete cell for application of lug straps to the plates thereof and means actuated by said toothed plate moving means to move said holding means to and from position for seating a set of plate lugs in the recesses in the stationary toothed plate.

6. A battery assembling device comprising, in combination, a frame, a toothed plate rigidly mounted thereon, a lever pivoted on said frame and projecting beyond said pivot, a link pivoted to said projection at one end, an arm pivoted to the remaining end of the link, a toothed plate fixed upon said arm, a member fixed on said frame upon which said arm initially slides to carry the last named plate initially in its own plane, a hook upon the free end of said arm to engage said member, movement of the link and arm subsequent to such engagement moving the plate out of its sliding plane, the sliding plane of said plate coinciding with the plane of the fixed plate, the teeth of said plates staggered to intermesh when engaged and spaced to receive strap lugs of battery plates of a complete cell therebetween.

7. A battery assembling device comprising, in combination, a frame, means to clamp battery plates in assembled position, means slidable on said frame to receive said clamping means, a toothed plate rigidly mounted on said frame to receive the plate lugs between the bases of the teeth of said plate, a revoluble shaft journaled in said frame, a plunger reciprocably mounted in said frame to initiate movement of said slidable means away from said plate, a cam rigid with said shaft to actuate said plunger, a lever rigid with said shaft, a movable plate carrying teeth adapted to intermesh with the first named teeth and to receive the plate lugs of opposite polarity from said first named lugs between the bases thereof, means actuated by said lever to move said movable plate, and means actuated by said lever to cause continued movement of said slidable means to fully remove assembled plates clear of said stationary plate.

8. A battery assembling device comprising, in combination: means to compress and retain the assembled elements of a complete cell including spacers interposed between plates bearing strap lugs of each polarity in alignment; a pair of toothed plates, the teeth on each plate staggered with and when in operative position intermeshing with the teeth on the opposite plate and fitting about the strap lugs of the respective rows; the ends of the teeth on each plate abutting the lugs enclosed by the opposite teeth whereby to completely close the space above that occupied by the battery elements; and means to cause relative movement of said plates in their plane into and out of operative position.

9. A battery assembling device comprising, in combination: means to hold the elements of a plurality of complete cells in assembly; a pair of plates each carrying teeth spaced to enclose the strap lugs of respective polarities; means carried by said plates to separate and locate lug straps in place for burning to the lugs of the adjacent cells; and means to cause relative movement of said plates to and from operative position.

10. A battery assembling device comprising, in combination: means to hold the elements of a complete cell in assembly; a pair of plates carrying teeth spaced to receive the strap lugs of respective polarities therebetween; the teeth on each plate staggered to intermesh with the teeth on the other plates in the space between lugs of opposite polarity; a lever and link means to cause relative movement between said plates to and from lug-enclosing positions and a bar carried by said lever means to space lug straps of opposite polarity when said lever is in plate-closing position.

11. A battery assembling device comprising, in combination: means to hold the elements of a complete cell in assembled relation; a pair of toothed slidable plates; the teeth upon said plates in staggered relation to intermesh when moved together and spaced to receive strap lugs of the respective polarities carried by the battery plates; the teeth beyond their lug-enclosing portions tapered to the thickness of the opposed lugs and of a length to abut said lugs; a link connected to each of said plates; a lever pivoted between its ends; said links pivoted to said lever upon opposite sides of its pivot whereby to slide said plates to and from operative positions and means to guide the movement of said plates.

WILLIAM WARREN HOLE.